3,356,511
METHOD OF TREATING DRUPACEOUS FRUIT
D Loyd Hunter, 33 S. 2nd Ave., Yakima, Wash. 98902, and James R. Oyler, R.D. 1, Biglerville, Pa. 17307
No Drawing. Filed Dec. 30, 1963, Ser. No. 334,597
9 Claims. (Cl. 99—193)

ABSTRACT OF THE DISCLOSURE

The method of pitting drupaceous fruit comprising quick freezing the outer layer only of the fruit, then pitting the fruit, and then immediately freezing such fruit solid throughout.

---

This invention relates to a method of handling cherries and other drupaceous fruits, and particularly to a method of pitting such fruits.

It has been proposed to cool cherries prior to pitting them for the purpose of lessening the loss of juice during the pitting process. It has also been proposed to freeze cherries prior to pitting them for a similar reason. The disadvantages of these methods are that a substantial quantity of juice is still lost if the cherry is merely cooled, and while there is little loss of juice if the cherry is frozen solid, there is a substantial loss of flesh during the pitting operation.

It is a main object of the present invention to provide a method of pitting cherries and other drupaceous fruit that overcomes the above disadvantages. We have discovered that this can be done by subjecting cherries to a quick freezing step to cool only the outer layer of the cherry flesh below 32° Fahrenheit and leave the inner or center portions above 32° Fahrenheit, effecting the pitting operation while the cherries are in such condition, and then freezing the cherries solid.

Various other objects will be apparent from the following description.

In preparing the cherries for the pitting operation, we have found that the ideal surface temperature of a cherry for pitting is around 29° Fahrenheit and in any event within the range of 26°–31° Fahrenheit.

The surface temperature can be obtained without freezing the interior flesh of the cherry by subjecting the cherry, which is around 38° Fahrenheit, to a quick cooling step, carried out at a temperature of from 10°–15° Fahrenheit for a period of time of seven to twelve minutes.

The above surface cooling step can be effected by depositing the cherries on a mesh belt and moving the cherries over a cold blast of air. We prefer to deposit the cherries on an upper belt, which travels into a cold air tunnel or chamber, and which, at the other end thereof, deposits the cherries on a lower belt, which conveys the cherries back out through the tunnel or chamber. The cherries are subject to the cold air blast while on both belts.

The pitting step can be carried out with a standard pitter, such as a Dunkley pitter produced by Dunkley Co., of Kalamazoo, Michigan.

Immediately after the pitting step, the cherries are frozen solid. This can be done on a mesh belt that carries the cherries over a cold air blast. At the beginning of the belt, the air temperature is around +5 degrees Fahrenheit, and the air temperature drops until at the end, the air temperature is around −25° Fahrenheit. The cherries stay on this belt for about twenty minutes.

With our method there is an optimum minimum loss of juice and flesh, i.e., practically no juice or flesh is lost. Also, our preliminary quick cooling step, followed by pitting, makes it easier to effect a final freezing of the cherries. In carrying out the preliminary quick cooling step, the cherries are handled so that they do not freeze in clusters. If the latter occurred, it would make separation necessary in order to carry out the pitting operation.

In carrying out our preliminary quick cooling step, we have found that optimum results are obtained if the outer layer of the cherry is frozen solid to a thickness not less than one-twentieth of the radius of the cherry and not exceeding one-eighth of such radius. If the layer is thinner than above specified, excessive juice is lost, while if the layer is thicker, excessive flesh is lost.

While the invention has been described in connection with handling cherries, and while the invention has particular application to cherries, the method of our invention can be applied to other drupaceous fruits with some benefit.

Having described the invention in what is considered to be the preferred embodiment thereof, it is desired that it be understood that the invention is not to be limited other than by the provisions of the following claims.

We claim:
1. The method of pitting and handling drupaceous fruit to effect an optimum minimum loss of juice and flesh, said method comprising,
   quick cooling the fruit in a manner such as to freeze only the outer layer of such fruit while leaving inner flesh portions unfrozen,
   pitting the fruit while in such condition, and then immediately freezing such fruit solid throughout.

2. The method of pitting and handling drupaceous fruit to effect an optimum minimum loss of juice and flesh, said method comprising,
   quick cooling the fruit in a manner such as to freeze only the outer layer of such fruit at a temperature of approximately 30° Fahrenheit, while leaving inner flesh portions unfrozen,
   pitting the fruit while in such condition, and then immediately freezing such fruit solid throughout.

3. The method of pitting and handling drupaceous fruit to effect an optimum minimum loss of juice and flesh, said method comprising
   quick cooling the fruit in a manner such as to freeze only the outer layer of such fruit at a temperature of approximately 30° Fahrenheit by a freezing step carried out at a temperature of from 10° to 15° Fahrenheit for a time of from 7 to 12 minutes while leaving inner flesh portions unfrozen,
   pitting the fruit while in such condition, and then immediately freezing such fruit solid throughout.

4. The method of pitting and handling drupaceous fruit to effect an optimum minimum loss of juice and flesh, said method comprising
   quick cooling the fruit in a manner such as to freeze only the outer layer of such fruit at a temperature of between 24° and 30° Fahrenheit, while leaving inner flesh portions unfrozen,
   pitting the fruit while in such condition, and then immediately freezing such fruit solid throughout.

5. The method of pitting and handling drupaceous fruit to effect a minimum loss of juice and flesh, said method comprising
   quick cooling the fruit in a manner such as to freeze only the outer layer of such fruit to a thickness not less than one-twentieth of the radius of the fruit while leaving the inner flesh portions unfrozen,
   pitting the fruit while in such condition, and then immediately freezing such fruit solid throughout.

6. The method of pitting and handling drupaceous fruit to effect an optimum minimum loss of juice and flesh, said method comprising
   quick cooling the fruit in a manner such as to freeze only the outer layer of such fruit to a thickness not greater than one-eighth of the radius of such fruit while leaving inner flesh portions unfrozen, pitting the fruit while in such condition, and then immediately freezing such fruit solid throughout.

7. The method of pitting and handling drupaceous fruit to effect an optimum minimum loss of juice and flesh, said method comprising quick cooling the fruit in a manner such as to freeze only the outer layer of such fruit to a thickness not less than one-twentieth and not greater than one-eighth of the radius of such fruit while leaving inner flesh portions unfrozen, pitting the fruit while in such condition, and then immediately freezing such fruit solid throughout.

8. The method of pitting and handling drupaceous fruit to effect an optimum minimum loss of juice and flesh, said method comprising quick cooling the fruit in a manner such as to freeze only the outer layer of such fruit at a temperature of approximately 26° Fahrenheit by a freezing step carried out at a temperature of from 10° to 15° Fahrenheit for a time of from 7 to 12 minutes, to a thickness not less than one-twentieth of the radius of the fruit and to a thickness not greater than one-eighth of the radius of such fruit while leaving inner flesh portions unfrozen, pitting the fruit while in such condition, and then immediately freezing such fruit solid throughout.

9. The method of pitting and handling drupaceous fruit to effect an optimum minimum loss of juice and flesh, said method comprising quick cooling the fruit in a manner such as to freeze only the outer layer of such fruit while leaving inner flesh portions unfrozen, and pitting the fruit while in such condition.

References Cited

UNITED STATES PATENTS 2,103,925   1/1967   Zarotschenzeff _____ 99—193

HYMAN LORD, *Primary Examiner.*

A. LOUIS MONACELL, *Examiner.*

M. VOET, *Assistant Examiner.*